United States Patent Office 3,128,233
Patented Apr. 7, 1964

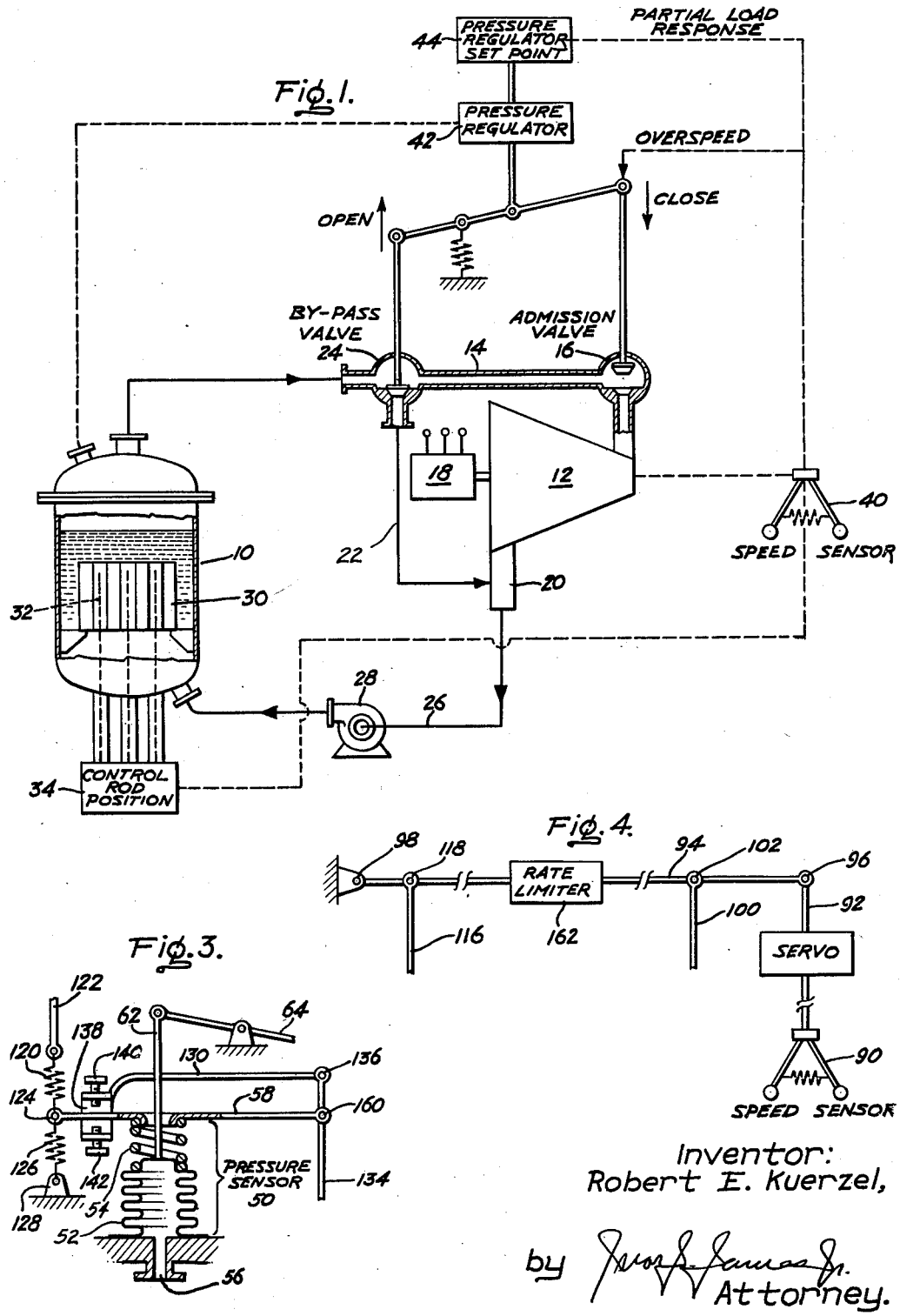

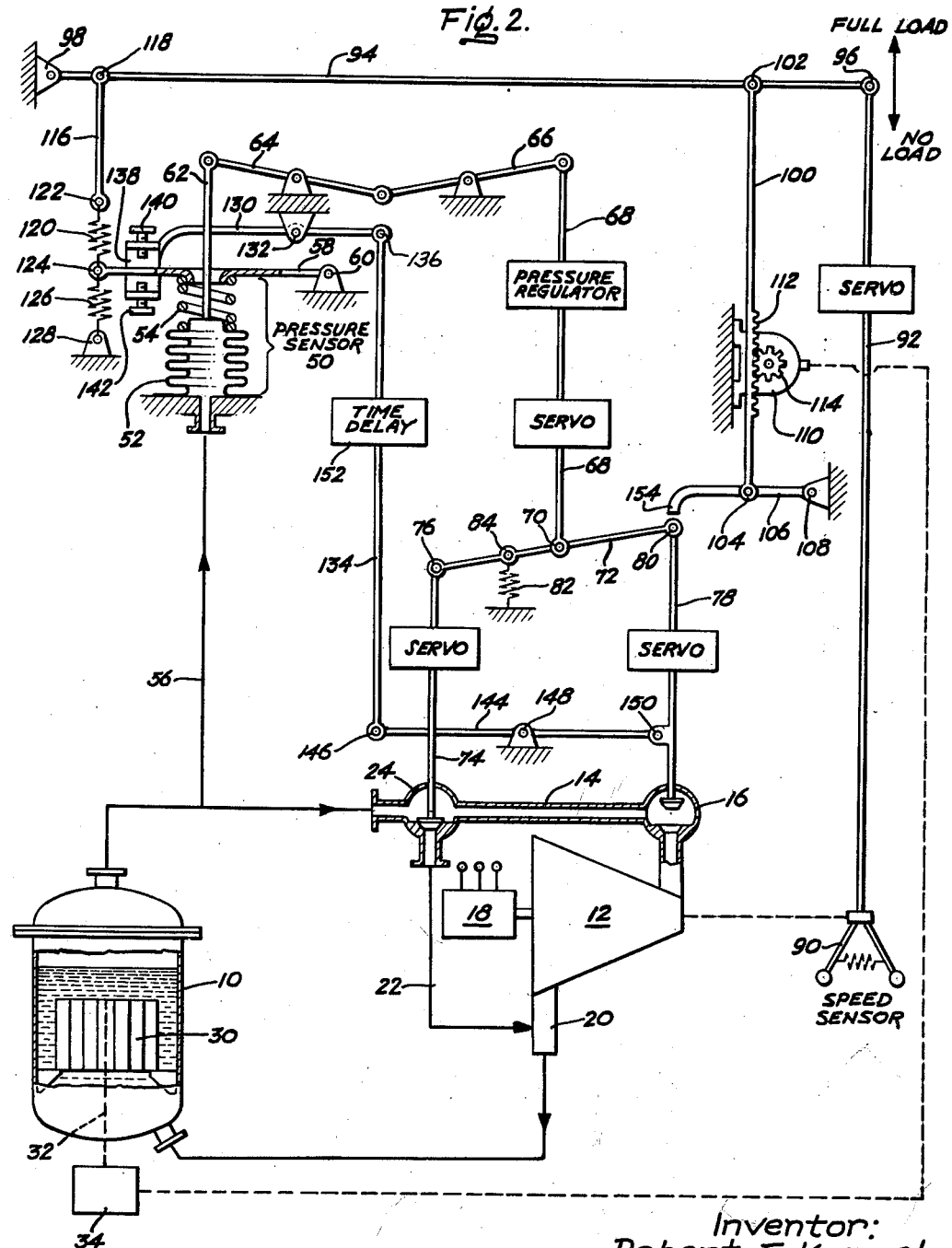

3,128,233
CONTROL OF SINGLE CYCLE POWER SYSTEM HAVING A STEAM GENERATING REACTOR
Robert E. Kuerzel, San Jose, Calif., assignor to General Electric Company, a corporation of New York
Filed Aug. 7, 1961, Ser. No. 129,717
7 Claims. (Cl. 176—24)

This invention relates to a control system for power systems driven by pressurized motive fluid and, more particularly, to a control system for providing rapid load response in single cycle fluid driven power systems.

While the practice of this invention is subject to a wide variety of modifications and variations it is particularly suited for use with boiling moderator-coolant type nuclear reactors, such as boiling water reactors, for supplying power to single cycle turbine power systems.

In boiling liquid moderator reactors, the moderator cools the reactor fuel and slows down or moderates fast or fission neutrons released through fission events in the fuel to increase the probability of an occurrence of subsequent fissions and to maintain a chain fission reaction. A portion of the moderating liquid is converted into vapor within the reactor, the vapor being generally supplied to a turbine as motive fluid. A boiling moderator reactor can be designed so that the formation of moderator vapor bubbles decreases the atomic ratio of moderator to fuel, thus decreasing the amount of moderator in the reactor core and thereby decreasing reactivity. In other words, increased reactivity tends to increase heat generation so that more vapor bubbles are formed and these bubbles, in turn, tend to decrease reactivity. Thus, it can be seen that such a reactor fails safe and is, therefore, self-regulating. If, however, the self-regulating boiling reactor is enclosed in a pressure vessel and the pressure is increased substantially during operation without compensatory adjustments being made in the reactor power level as generally controlled by the positioning of the reactor control rods, the reactor may not be self-regulating since the increase in pressure tends to inhibit formation of moderator vapor voids. For this reason, it is desirable to maintain the reactor pressure within prescribed limits in order to maintain fail-safe operation.

Pressure control means are therefore generally provided for maintaining a substantially constant reactor pressure for a particular reactor power level. In usual practice, a reactor power level is changed in response to load changes on the power system by changing the position of one or more reactor control rods. The change in the reactor power level and vapor output resulting from a change in the control rod position is, however, a relatively long term change generally taking place over a 20 to 30 second period. Such a delay in the change in vapor output is, of course, generally undesirable in practice where considerably faster responses are desired. It is therefore desirable in boiling reactor power systems to provide means for changing the motive fluid output substantially instantaneously to permit the system to respond to fast load changes during the 20 to 30 second delay period without permitting pressure changes in the reactor which are sufficient to defeat its self-regulating characteristic. The present invention provides such means.

It is therefore an object of this invention to provide an improved control system for controlling a single cycle power system.

Another object of this invention is to provide in a single cycle power system control means for rapidly varying the motive fluid output from the motive fluid generator in response to system load changes.

Yet another object of this invention is to provide a control system for maintaining the pressure in the motive fluid generator within prescribed limits.

An additional object of this invention is to provide integrated motive fluid generator pressure and turbine speed sensing and responsive means for controlling the rate of motive fluid output in a single cycle power system.

A further object is to provide means for automatically varying the power level in a boiling moderator-coolant reactor in response to system load changes.

A still further object is to provide economical means for controlling a single cycle power system including a boiling moderator-coolant nuclear reactor.

In the following description steam is used as an illustration of the motive fluid, it being understood that other gaseous fluids hereinafter specified may be substituted.

Briefly stated, in accordance with one embodiment of the invention, a control system is provided for controlling a single cycle fluid driven power system in which steam from a generator, such as a boiling water reactor, is generally supplied to a turbine and is exhausted to a condenser for return to the reactor as condensate-feedwater. Pressure sensitive and responsive means are provided by the invention for sensing changes in reactor pressure and varying the rate of steam flow from the reactor to compensate for the pressure changes in order to maintain a constant desired base pressure in the reactor, the constant base pressure being a function of turbine load or speed. Under a constant load condition, therefore, the control system of this invention maintains a constant pressure in the reactor. Control rod positioning means is provided by the invention for automatically varying the reactor power level in accordance with changes in the turbine load. Thus, upon load changes, the position of one or more control rods is changed to provide a relatively long term reactor power level change and the desired base pressure of the pressure sensitive and responsive means is simultaneously changed to cause an instantaneous change in the reactor steam output. These instantaneous changes in steam flow are effected by means of pressure changes on the body of boiling water (saturated at the base pressure and temperature) in the reactor system, which changes either enhance or inhibit the vaporization of the saturated water.

In order to prevent excessive pressure changes in the reactor which may affect its fail-safe characteristic, means are provided for closely limiting the change of the base pressure. Feedback means is also provided by the invention for re-setting the prescribed limits within which the base pressure may be adjusted after the control system has responded to load changes, and in accordance with an alternate embodiment of the invention, for re-setting the base pressure. The feedback means, which is positioned as a function of the turbine inlet valve position, has a time delay element for delaying the re-setting operation until after the relatively long-term power level change in the reactor has been completed. The control system also provides an overspeed responsive means for overriding the pressure sensitive and responsive means in the event of a substantial turbine speed increase. The overspeed means closes the turbine inlet valve to stop steam flow to the turbine and simultaneously opens a by-pass valve to direct the steam to the system condenser, thereby maintaining substantially constant pressure in the reactor.

The subject matter which is regarded as the invention is particularly pointed out and distinctly claimed in the concluding portion of this specification. The invention, however, both as to organization and method of operation, together with further objects and advantages thereof, may best be understood by reference to the following description taken in connection with the accompanying drawings in which:

FIGURE 1 is a combined schematic flow and block control diagram of the present invention applied to a single direct cycle power system including a boiling reactor;

FIGURE 2 is a more detailed schematic view of one embodiment of the control system of this invention;

FIGURE 3 is a schematic view showing a modification in the feedback means of the control system shown in FIGURE 2; and FIGURE 4 is a schematic view showing a modification in the control system for limiting the rate of change of pressure in the system in response to changes in turbine speed.

Referring first to FIGURE 1, a combined schematic process flow and instrumentation block diagram of the present invention is shown applied to a single or direct cycle boiling water reactor 10 supplying steam to turbine 12 through line 14 provided with admission valve 16. Turbine 12 drives a generator 18 and is provided with condenser 20. Bypass line 22 is provided with bypass valve 24 by means of which steam may bypass turbine 12 and flow directly to condenser 20. Condensate is returned from condenser 20 by means of line 26 and pump 28 as feedwater to reactor 10.

Reactor 10 is provided with a nuclear reactor core 30 capable, with the water as moderating coolant, of sustaining a chain nuclear fission reaction and generating substantial quantities of heat to vaporize part of the water. Control poison elements 32 extend into core 30 and are positioned by means of remotely actuated control element drive units 34 whereby the operating power level of core 30 may be varied.

In the control system of the present invention, turbine 12 is provided with speed sensor or governor 40. Reactor 10 is provided with pressure regulator 42 which is connected so as to sense and be responsive to the pressure of fluids existing within reactor 10. Regulator 42 is in turn provided with means 44 for varying the pressure regulator set or control point. Pressure regulator 42 is connected to admission valve 16 and bypass valve 24 to make these valves responsive to sensed pressures in reactor 10. Speed sensor and governor 40 are connected to control element drive unit 34, to cause it to reposition control elements 32, to means 44 for adjusting the pressure regulator set point, and to admission valve 16 to close that valve in the event of a sensed turbine overspeed.

Reactor pressure control is achieved by pressure regulator 42 acting on the turbine control valves 16 and 24. Reactor load control or power level is achieved by operating control elements 32 by means 34 in response to the signal from turbine speed sensor and governor 40. The turbine speed sensor 40 can close the admission valve 16 if necessary to control turbine overspeed. In this event, bypass valve 24 is opened. The pressure regulator 42 trims the turbine control valves to match reactor power output. In addition, turbine governor 40, through its connection to means 44, can impose partial load response upon the control valves. Fast load response is thus obtained by allowing the turbine governor 40 within fixed limits, to vary the set point of the pressure regulator 42. This permits fast changes in reactor steam output to be accomplished in response to fast load demand changes on turbine 12 sensed by speed sensor 40 by varying the reactor pressure within fixed limits, and whereby vaporization of the saturated coolant in the reactor is either enhanced or inhibited quickly during the initial stages of the relatively long period in which control element movement is affected to bring the reactor power level to a value matching the load demand and to return the reactor operating pressure to the normal value.

A load increase demand on turbine 12 induces in the system the following sequence of events. The speed of turbine 12 decreases and this is sensed by sensor 40. Control rod drives 34 are immediately actuated to initiate an increase in the power level to meet the demand, an effect which takes a relatively long time, that is about 20 to 30 seconds. Simultaneously, means 44 is actuated in response to the speed decrease to lower the pressure regulator set point. Pressure regulator 42 then attempts to establish a lower operating pressure in reactor 10 than that which existed at the time of the load demand change. This causes admission valve 16 to be opened further, supplying increased quantities of steam to turbine 12 to meet the load demand. These increased quantities of steam are supplied, during the first few seconds following the load change, from energy stored in the saturated coolant in reactor 10, i.e., through flash vaporization of saturated or boiling water during the operating pressure decrease. The permissible set point change at means 44 is limited within a range which does not effect the self-regulating characteristic of the reactor. Speed sensor 40, however, is not so limited and is free to reposition the reactor control elements 32 through means 44 to provide the full demand load increase. During the period that the reactor power level is increased to meet the load demand and to change the turbine speed, means 44 is simultaneously repositioned to the previous set point whereby the system returns to normal operating pressure and turbine speed at increased reactor power level and steam flow.

A similar but opposite sequence of events occurs on a load decrease. For radical load decreases, such as in the event of a turbine trip, speed sensor and governor 40 actuate turbine valves 16 and 24 directly whereby steam is bypassed to the condenser and pressure regulator 42 continues to maintain reactor pressure by repositioning bypass valve 24.

Referring now to FIGURE 2, a more detailed illustration of one embodiment of this invention is shown in a single direct cycle power system previously referred to in FIGURE 1, and including boiling reactor steam source 10, turbine 12, steam line 14, admission valve 16, generator-load 18, condenser 20, by-pass steam line 22 with valve 24, and condensate return line 26. In order to simplify the description of the invention, details of the reactor 10 such as control rods, control rod drive devices, circulating pumps, and the like have not been illustrated. Likewise, details and accessories of the turbine 12 have not been illustrated. The structure and operation of such standard items are well known to those skilled in the art.

A control system including one embodiment of the invention will now be described in detail. The control functions of the systems are accomplished in the embodiment shown by means of mechanical linkages for operatively connecting the various elements of the control system. It will be apparent that a control system utilizing this invention may incorporate many types of couplings other than the illustrated mechanical linkages. For example, electromagnetic coupling means or combination mechanical-electromagnetic means may be utilized without departing from the spirit of this invention. The same is true of pneumatic and hydraulic means.

In FIGURE 2 a pressure responsive actuator 50 is shown comprising an expansible bellows 52 and a biasing spring 54. The interior of the expansible bellows 52 is connected to the steam supply line 14 by line 56. Since the pressure in the steam supply line 14 is essentially identical to the pressure in the boiling water reactor 10, the interior of the expansible bellows 52 is effectively subjected to reactor pressure. Alternatively, and desirably in the event of significant pressure drops in line 14, bellows 52 may be directly connected to reactor vessel 10 as indicated schematically in FIGURE 1. The biasing spring 54 opposes expansion of expansible bellows 52 and urges the bellows in a collapsing direction. The particular spring biasing force exerted by the biasing spring 54 is determined by the position of an arm 58. The arm 58, which is connected to a fixed pivot point 60 at one of its ends in the embodiment shown, may be moved in response to changes in the turbine load as indicated by changes in the turbine speed. While the particular control linkage for causing movement of arm 58 will be described in detail later, it should be noted at this point that, for a particular constant turbine load and speed, arm 58 is located in a corresponding fixed position. It can thus be seen that, under constant load conditions, an increase in pressure in the reactor 10 will cause the expansible bellows 52 to expand against the force of biasing spring 54. Likewise, a decrease in reactor pressure will permit the biasing spring 54 to move the expansible bellows 52 in the collapsing direction.

A link 62 is connected to the expansible bellows so as to move therewith. Link 62 is connected by a suitable linkage comprising links 64 and 66 to a link 68. The linkage connecting links 62 and 64 is such that an upward movement of link 62 (upon a reactor pressure increase) as viewed in FIGURE 2 will cause a corresponding upward movement of the link 68. Likewise, a downward movement of link 62 (upon a pressure decrease) will cause a downward movement of the link 68. Link 68 is connected at a pivot point 70 to approximately the center of a flow splitter bar 72. A link 74, pivotably connected at one end 76 of the flow splitter bar 72, is operatively connected to the bypass valve 24 so that an upward movement of the link 74 will cause the bypass valve to open and a downward movement of the link 72 will cause the bypass valve to close. A link 78, pivotally connected at the other end 80 of the flow splitter bar 72, is operatively connected to the turbine admission valve 16 so that an upward movement of the link 78 will cause the admission valve to open and a downward movement of the link 78 will cause the admission valve to close. A spring biasing means 82 is connected to the flow splitter bar 72 at a point 84 adjacent the end 76 of the flow splitter bar, the biasing force of the biasing means 82 being such that it will cause the link 74 to move downwardly to close the bypass valve 24.

It will therefore be apparent that, under constant load conditions, an increase in the reactor pressure causes upward movement of links 62 and 68 as viewed in FIGURE 2. The upward movement of the link 68 is transmitted to the flow splitter bar 72 through the pivotal connection 70. The flow splitter bar 72 pivots in a counterclockwise direction about the point 84 where the spring biasing means 82 is connected to the flow splitter bar 72. The link 78 moves upwardly to open the turbine admission valve 16. The opening of the admission valve 16 permits more steam to flow to the turbine and, consequently, results in a decreased reactor pressure correcting the initial pressure rise. Similarly and conversely, a decrease in reactor pressure under constant load conditions results in rotation of the flow splitter bar 72 in a clockwise direction about the point 84. Clockwise rotation causes the link 78 to move downwardly to close the turbine admission valve 16. Closing the turbine admission valve 16 results in decreased steam flow and, consequently, an increased reactor pressure correcting the initial pressure decrease. Thus, it will be seen that, under constant load conditions, the pressure responsive actuator responds to pressure changes in the reactor by moving the turbine admission valve 16 in a manner which will return the pressure in the reactor to the value existing before the change, the pre-existing or base pressure being determined by the biasing force of the spring 54.

In practice, load changes on a power system are frequently encountered. On load increases, it is desirable to increase the power supplied to the turbine 12 as rapidly as practical to follow such load changes. Therefore, means are provided by this invention for rapidly varying the power input to the turbine in response to load changes on the turbine. A speed-responsive means 90 is shown connected to a link 92. The speed-responsive means 90 causes the link 92 to move upwardly in response to load increases as reflected by a speed decrease and downwardly in response to load decreases. The link 92 is connected to a bar 94 by means of a pivotal connection 96 at one end of the bar 94. The other end of the bar 94 is connected to a fixed pivot point 98. The bar 94 rotates in a counterclockwise direction around point 98 on load increases and in a clockwise direction on load decreases. Adjacent the movable end of the bar 94, a link 100 is pivotally connected to the bar 94 at a pivot point 102. The link 100 is connected at its lower end 104 (as FIGURE 2 is viewed) to an overspeed control arm 106 mounted at one of its ends to a fixed pivot point 108. The operation of the overspeed control arm will be discussed in detail at a later point in this description.

The link 100 is also connected to control or servo means 110 for varying the position of the control poison elements in the boiling water reactor so as to vary the reactor power level as noted above in the description of FIGURE 1. As shown, the link 100 may be connected to the control rod actuating means through a rack and pinion connection 112 and 114. As the turbine load increases and the speed decreases, link 100 is moved upwardly by the bar 94. This upward movement is transmitted through the servo means 110 to actuate control element drive means 34 and reposition the reactor control elements 32 to provide greater reactivity in the reactor core 30 and, therefore, increased power lever and steam output. Similarly and conversely, a downward movement of the link 100 on turbine speed increases representing load decreases cause insertion of the control elements in the reactor to provide reduced reactor reactivity and correspondingly reduced power level and steam output.

Alternately, the servo means 110 for varying the position of the control elements may be actuated by variations in the frequency of an A.C. voltage generated by the generator. Also, the position of the control elements may be accomplished by suitable means actuated by an operator standing by to observe the load on the power system.

The variation in reactor power level and steam output as a result of repositioning the control elements upon load change is a relatively long term effect which takes place over a substantial time interval, such as 20 to 30 seconds. It is desirable to provide for instantaneous changes in the power supplied to the turbine 12 by the reactor 10 in the event of such load changes. To accomplish this, a link 116 may be pivotally connected at one of its ends to the bar 94 at a point 118 near the fixed pivot point 98. A spring 120 is joined to the other end 122 of the link 116 and to the movable end 124 of the arm 58. Another spring 126 is connected to the movable end 124 of the arm 58 and to a fixed base point 128.

An increase in load on the turbine 12 causes the link 116 to move upwardly, the movement of link 116 being transmitted through the springs 120 and 126 and pivots the bar 58 in a counterclockwise direction about its fixed pivot point 60. This movement reduces the biasing force exerted on the expansible bellows 52 by the biasing spring 54. Therefore, the expansible bellows expands and moves the links 62 and 68 upwardly. As described before, upward movement of the link 30 results in the opening of the admission valve 16 permitting additional steam to flow to the turbine 12. The increased flow causes the pressure in the reactor 10 to be reduced as a result. The reduced pressure permits additional water in the reactor to flash into steam, thereby providing an instantaneous power increase to the turbine 12 by utilizing the stored energy in the saturated water in the reactor 10. In like manner, a load decrease on the turbine 12 causes the link 116 to move downwardly to increase the biasing force of the spring biasing means 54 on the expansible bellows 52. The bellows moves in the collapsing direction and moves links 62 and 68 downwardly. Movement of link 68 downwardly results in a closing movement of the turbine admission valve 16. The reactor pressure then increases and steam flow to the turbine 12 decreases.

It will thus be seen that a load change on the turbine 12 will be transmitted through the speed-responsive means 90 to control both the position of the control elements within the reactor 10 and the magnitude of the steam pressure within the reactor 10. By changing the positioning of the control rods, a long term change is made in the reactivity and power level of the reactor 10 to new equilibrium values. Instantaneous power response, however, is provided by rapidly varying the reactor pressure to change the rate of steam flow from the reactor instantaneously to meet the new value immediately.

The pressure change within the reactor may not exceed predetermined limits without risk of inhibiting the self-regulating characteristic of the boiling water reactor 10. This is true because a given percentage change in pressure is equivalent to a certain percentage change in vapor void volume in the core, which in turn is directly related to a fixed change in moderator to fuel ratio, and the latter in turn is equivalent to a particular change in excess reactivity which affects power level. The degree of pressure variation which is undesirable depends upon the reactor core physics, the operating pressure, and the nature of the coolant moderator, and may be readily calculated using the physical characteristics of the particular reactor. For example, in a boiling light water reactor the power level change resulting from a change in pressure may be determined by applying the known PVT (pressure, volume, temperature) characteristics of steam to the known reactivity vs. moderator to fuel ratio characteristics of that reactor. (That ratio is a function of the degree of vapor voids present which in turn is a function of pressure.) Such characteristics for a particular boiling water reactor are shown in S. Untermyer, "Boiling Reactors—Direct Steam Generation for Power," Nucleonics, vol. 12, No. 7, July 1954, pages 43–47, particularly FIGURE 4. For self-regulating boiling reactors, the more important limitation with regard to pressure change involves limitation of the extent of fast pressure increases in response to load decreases. Such load decreases cause a turbine speed increase which, as discussed below, initiates power level and reactivity reduction through control element repositioning.

Therefore, means are provided by the invention for limiting the pressure variation which may occur in the reactor. In the embodiment shown in FIGURE 2, a bar 130 is supported at an intermediate fixed pivot point 132. One end of the bar 130 is connected to a link 134 at a pivotable connection 136. For reasons which will be more fully explained later, bar 130 may be considered to be a rigid, non-pivoting bar at the particular instant when load changes are imposed on the turbine 12. The other end of the bar 130 forms a clevis 138 carrying adjusting screws 140 and 142 for defining a limited space within which the bar 58 may move.

Upon a load increase and prior to the time valve 116 opens further, bar 58 may move upwardly only until it contacts the adjusting screw. Any additional movement of the link 116 will not be transmitted to the bar 58, but will be absorbed in the springs 120 and 126. Likewise, excessive movement of the link 116 upon a load decrease will be absorbed in the springs 120 and 126 after the bar 58 has engaged the adjusting screw 142. In effect, the bar 130 and the associated clevis arrangement regulate the permissible change in the biasing force of the spring biasing means 54. Therefore, it will be seen that a relatively large change in the load on the turbine 12 will be transmitted through link 100 to reposition the control elements to provide for a new level of power output. Because of the undesirability of instantaneously and excessively changing the pressure in the reactor 10, however, the full load change will not be transmitted through link 116 to the bar 58, but only such an amount which will not result in an undesirable pressure variation.

As pointed out before, the link 130 is connected to link 134 at pivot point 136. The other end of the link 134 is pivotably connected to a link 144 at pivot point 146. Link 144 is pivotably mounted at approximately its midpoint to a fixed pivot 148. The other end of the link 144 is pivotally connected at pivot point 150 to the link 78 which controls the turbine admission valve 16. Link 144 is rotated about the fixed pivot 148 in response to a change in the turbine admission valve position and the change is transmitted to the link 134. The change in the admission valve position is transmitted through an adjustable time delay mechanism 152 in the link 134 to move the bar 130 in response to a change in the turbine admission valve position. The result of the movement of the link 130 is to re-position the clevis 138 with respect to the arm 58 so that upon additional changes in the turbine load, the arm 58 may be moved again in order to change the pressure in the reactor 10. It is necessary in this respect that the time delay mechanism 152 delay the movement of the clevis 138 a sufficient time to permit the control elements to be repositioned to set a new power level within the reactor 10. If the repositioning of the clevis 138 were done rapidly, the system would be reset prematurely so that the clevis 138 would, in effect, exert no control on the change in the reactor pressure.

Occasionally, there may be an abrupt load removal from the turbine such as might occur from a tripping out of the generator driven by the turbine 12 because of a failure in the power distribution system. As a result of an abrupt load removal, the turbine 12 will tend to accelerate rapidly and soon reach an excessive speed. In order to prevent such an excessive turbine overspeed condition, overspeed control means may be provided for overriding the pressure sensitive and responsive means and cutting off, partially or fully, the steam flow to the turbine 12 by closing the admission valve 16. As pointed out previously, the pressure in the reactor 10 will increase as the admission valve 16 is closed. An excessive rise in the reactor pressure may reduce the self-regulating characteristic of the system. Therefore, it is desirable to open the bypass valve 24 as the admission valve 16 is closed to divert steam through bypass line 22 to the condenser 20, thus keeping the pressure within the reactor 10 within the predetermined limits in which fail-safe operation will not be disturbed.

In order to prevent excessive overspeed of the turbine 12, such as might result from complete load loss, the link 100 is connected at one of its ends 104 to the overspeed control arm 106 which, in turn, is connected at one of its ends to a fixed pivot point 108. The other end 154 of the arm 106 is positioned in an overlapping, but normally spaced, relationship with the flow splitter bar 72, the end 154 positioned adjacent the end 80 of the bar 72. It will be seen that as the link 100 moves downwardly on turbine load decreases as reflected by turbine speed increases, the arm 106 will rotate in a counterclockwise direction about its pivot point 108. Similarly, the arm 106 will rotate in a clockwise direction on turbine load increases. On normal speed increases occurring upon relatively low load decreases as contrasted with load losses, the end 154 will move toward the end 80, but will not make contact therewith because of the substantial spacing between the two ends and the relatively low load reduction and link 100 movement. It will thus be appreciated that the overspeed control arm 106 exerts no influence on the control system of this invention when only such normal changes in turbine operation speed are encountered.

However, the link 100 will move downwardly (as viewed in FIGURE 2) a substantially greater distance when excessive speed increases are sensed by the speed-responsive means 90 such as in the case of a complete load loss. The overspeed control arm 106 in such event is rotated a correspondingly increased amount in a counterclockwise direction so that the end 154 of the arm 106 will contact the end 80 of the flow splitter bar 72 and rotate the bar 72 in a clockwise direction about the pivot point 70. Clockwise rotation of the flow splitter bar 72 moves the link 78 downwardly, thereby moving the admission valve 16 in a closing direction to shut off steam flow to the turbine 12. As a result, the turbine speed increase will be arrested below a permissible maximum value.

As previously pointed out, the movement of the admission valve 16 in its closing direction will normally result in a pressure rise in the reactor 10. Excessive pressure increases in the reactor, as noted above, may be sufficient to inhibit the desired self-regulating characteristic of the reactor. Therefore, it will be noted that clockwise movement of the flow splitter bar 72 will also cause the link 74 to move upwardly so as to open bypass valve 24 and allow steam flow to pass through the bypass line 22 to the condenser 20 associated with the turbine 12. The opening of the bypass valve arrests the increases in pressure within the reactor 10 otherwise occurring and maintain reactor pressure within permissible limits.

Referring now to FIGURE 3, a modification in the connection of the arm 58 is shown. It will be seen that the left end (as FIGURE 3 is viewed) of the arm 58 is pivotally connected to the link 134 at point 160 rather than being connected to a stationary pivot point such as shown in FIGURE 1. This connection permits the resetting of arm 58 to the original base pressure so that the reactor pressure will eventually progress back to the original value which existed prior to the load change. The delay in the resetting of the base pressure to the original value will be determined by the time-delay mechanism 152 positioned in the link 134 which has been fully described above in regard to FIGURE 2.

Referring to FIGURE 4, an additional modification which may be found to be desirable is the locating of a rate limiter 162 within the structure of bar 94 shown at the top of FIGURE 2 previously described. It will be recalled that, as shown in FIGURE 2, the bar 58 was moved the maximum distance allowed by the adjusting screws 140 and 142 whenever the bar 94 was moved an amount sufficient to cause the maximum allowed movement of bar 58. By using the rate limiter 162 shown in FIGURE 4, the bar 94, acting through link 116 and springs 120 and 126 as shown in FIGURE 2, will move the bar 58 a given amount instantaneously and then move it further at a rate governed by the rate limiter 162 before striking either of the stop screws 140 and 142. This provides a smoother load changing characteristic by making a more gradual use of the stored energy within the saturated water in the reactor 10 by providing for a slower adjustment of the pressure base point.

The servo elements indicated in FIGURES 2 and 4 are conventionally used in power control or other instrumentation systems to relay or transduce signal impulses, or both. They are well known items of commerce.

Thus, it will be seen that the invention provides pressure sensitive and responsive means for sensing changes in reactor pressure and varying the rate of steam flow from the reactor to compensate for the pressure changes in order to maintain a constant desired base pressure in the reactor, the constant base pressure being a function of turbine load or speed. Speed responsive means is also provided by the invention for varying the power level in the reactor in accordance with turbine speed. Limiting means are also provided by the invention for limiting the change of the base pressure within closely prescribed limits and a time-delayed feedback means is provided for resetting the limits within which the base pressure may be changed. The control system also provides overspeed control means for overriding the pressure sensitive and responsive means and cutting off steam flow to the turbine when an excessive speed is encountered.

It will be apparent that the control system of this invention is suitable for use with power generating sources other than the illustrated boiling water nuclear reactor power source. For example, the control system of this invention is suited for use in other types of power sources providing high pressurized motive fluids, such as steam or gas, to a load. Such power sources may include, in addition to nuclear reactors, fossil fuel sources and suitable combination of nuclear reactors and fossil fuel sources.

In addition to the boiling reactor moderated and cooled by light water (the natural isotopic mixture), boiling reactors moderated and cooled by deuterium oxide or heavy water, mixtures thereof with light water, volatile hydrocarbons such as diphenyl, the isomeric terphenyls, phenanthrene, anthracene, diphenyl oxide, tetrahydronaphthalene, and other paraffinic, naphthenic or aromatic hydrocarbons, as well as their deuterated homologues, or mixtures thereof may utilize the present invention.

As pointed out previously, the specific embodiments described herein are presented merely as examples of the many forms the practice of this invention may take. It will be apparent to those skilled in the art that this invention may be practiced with a wide variety of apparatus. Therefore, it is intended in the appending claims to cover all modifications and variations that came within the true spirit and scope of this invention.

I claim:

1. A control system for a single cycle power system including a steam generating nuclear reactor, control rods in said reactor for governing the power level of said reactor, a turbine, and valve means for controlling the rate of flow of steam from the reactor to the turbine, said control system comprising first means responsive to the speed at said turbine, second means responsive to the pressure in said reactor, means operatively connecting said first means to said reactor to set the control rod positioning so as to vary the power level in said reactor in accordance with said speed, means operatively connecting said first means to said second means to set a base pressure for said reactor in accordance with said speed, and means operatively connecting said second means to said valve means to vary the flow of steam from said reactor to said turbine in accordance with pressure changes in said reactor as sensed by said second means to maintain said pressure in said reactor.

2. A control system for a single cycle power system including a steam generating nuclear reactor, a turbine, and valve means for controlling the rate of flow of steam from the reactor to the turbine, said control system comprising first means responsive to the speed of said turbine, second means responsive to the pressure in said reactor, means operatively connecting said first means to said reactor to set the control rod positioning so as to vary the power level in said reactor in accordance with said speed, means operatively connecting said first means to said second means to set a base pressure for said reactor in accordance with said speed, limiting means for limiting the amount of change of said base pressure with changes in said speed, and means operatively connecting said second means to said valve means to vary the flow of steam from said reactor to said turbine in accordance with pressure changes in said reactor as sensed by said second means to maintain said base pressure in said reactor.

3. A control system for a single cycle power system including a steam generating nuclear reactor, control rods in said reactor for governing the power level of said reactor, a turbine, and valve means for controlling the rate of flow of steam from the reactor to the turbine, said control system comprising first control means responsive to the speed of said turbine, second control means responsive to the pressure in said reactor, means operatively connecting said first control means to said reactor to set the control rod positioning so as to vary the power level in said reactor in accordance with changes in said speed, means operatively connecting said first control means to said second control means to vary a base pressure for said reactor in accordance with changes in said speed, limiting means for limiting the amount of change of said base pressure with changes in said speed, means operatively connecting said second control means to said valve means to vary the flow of steam from said reactor to said turbine in accordance with pressure changes in said reactor as sensed by said second control means to maintain the base pressure determined by said first control means in said reactor, and feedback means responsive to the position of said valve means operatively connected to said limiting means for re-positioning said limiting means after a change in said speed so as to permit future variance of said base pressure, said feedback means including time delay means for delaying the repositioning of said limiting means until after the change in the power level in said reactor is complete.

4. A control system for a single cycle power system including a steam generating nuclear reactor, control rods in said reactor for governing the power level of said reactor, a turbine, and valve means for controlling the rate of flow of steam from the reactor to the turbine, said control system comprising first control means responsive to the speed of said turbine, second control means responsive to the pressure in said reactor, means operatively connecting said first control means to said reactor to set the control rod positioning so as to vary the power level in said reactor in accordance with changes in said speed, means operatively connecting said first control means to said second control means to vary a base pressure for said reactor in accordance with changes in said speed, limiting means for limiting the amount of change of said base pressure with changes in said speed, means operatively connecting said second control means to said valve means to vary the flow of steam from said reactor to said turbine in accordance with pressure changes in said reactor as sensed by said second control means to maintain the base pressure determined by said first control means in said reactor, and feedback means responsive to the position of said valve means operatively connected to said limiting means for re-positioning said limiting means after a change in said speed so as to permit future variance of said base pressure, said feedback means also being operatively connected to said second control means for resetting said base pressure to the value existing prior to said speed change, said feedback means including time delay means for delaying the repositioning of said limiting means and the resetting of said base pressure until after the change in the power level in said reactor is complete.

5. A control system for a single cycle power system including a steam generating nuclear reactor, control rods in said reactor for governing the power level of said reactor, a turbine, and valve means for controlling the rate of flow of steam from the reactor to the turbine, said control system comprising first control means responsive to the speed of said turbine, second control means responsive to the pressure in said reactor, means operatively connecting said first control means to said reactor to set the control rod positioning so as to vary the power level in said reactor in accordance with changes in speed, means operatively connecting said first control means to said second control means to vary a base pressure for said reactor in accordance with changes in said speed, first limiting means for limiting the rate of change of said base pressure with changes in said speed, second limiting means for limiting the amount of change of said base pressure with changes in said speed, means operatively connecting said second control means to said valve means to vary the flow of steam from said reactor to said turbine in accordance with pressure changes in said reactor as sensed by said second control means to maintain the base pressure determined by said first control means in said reactor, and feedback means responsive to the position of said valve means operatively connected to said second limiting means for repositioning said second limiting means after a change in said speed so as to permit future variance of said base pressure, said feedback means also being operatively connected to said second control means for resetting said base pressure to the value existing prior to said speed change, said feedback means including time delay means for delaying the re-positioning of said second limiting means and the resetting of said base pressure until after the change in power level in said reactor is complete.

6. In a single cycle power system including a steam generating nuclear reactor, control rods in said reactor for governing the power level of said reactor, a turbine, a condenser, first conduit means connecting said reactor and said turbine, second conduit means connecting said reactor and said condenser, first valve means for controlling the rate of flow of steam from said reactor to said turbine through said first conduit means, and second valve means for controlling the rate of flow of steam from said reactor to said condenser through said second conduit means; the improved control system comprising first control means responsive to the speed of said turbine, second control means responsive to the pressure in said reactor, means operatively connecting said first control means to said reactor to set the control rod positioning so as to vary the power level in said reactor in accordance with said speed, means operatively connecting said first control means to said second control means to set a base pressure for said reactor in accordance with said speed, means operatively connected to said second valve means to position said second valve means so as to prevent flow of steam through said said second conduit means when the speed of said turbine is below a selected value, means operatively connecting said second control means to said first valve means to vary the flow of steam from said reactor to said turbine through said first conduit means in accordance with pressure changes in said reactor as sensed by said second control means to maintain said base pressure in said reactor when the speed of said turbine is below said selected value, and means operatively connecting said first control means to said first and second valve means when said speed is above said selected value to position said first valve means so as to reduce the flow of steam through said first conduit means and to position said second valve means so as to permit the flow of steam through said second conduit means, thereby slowing said turbine and maintaining a substantially constant pressure in said reactor.

7. In a single cycle power system including a steam generating nuclear reactor, control elements in said reactor for governing the power level of said reactor, a turbine, a condenser, first conduit means connecting said reactor and said turbine, second conduit means connecting said reactor and said condenser, first valve means for controlling the rate of flow of steam from said reactor to said turbine through said first conduit means, and second valve means for controlling the rate of flow of steam from said reactor to said condenser through said second conduit means; the improved control system comprising first control means responsive to the speed of said turbine, second control means responsive to the pressure in said reactor, means operatively connecting said first control means to said reactor to set the control rod positioning so as to vary the power level in said reactor in accordance with changes in said speed, means operatively connecting said first control means to said second control means to vary a base pressure for said reactor in accordance with changes in said speed, first limiting means for limiting the rate of change of said base pressure with changes in said speed, second limiting means for limiting the amount of change of said base pressure with changes in said speed, means operatively connected to said second valve means to position said second valve means so as to prevent flow of steam through said second conduit means when the speed of said turbine is below a selected value, means operatively connecting said second control means to said first valve means to vary the flow of steam from said reactor to said turbine through said first conduit means in accordance with pressure changes in said reactor as sensed by said second control means to maintain said base pressure in said reactor when the speed of said turbine is below said selected value, feedback means responsive to the position of said first valve means operatively connected to said second limiting means for repositioning said second limiting means after a change in said speed so as to permit future variance of said base pressure, said feedback means also being operatively connected to said second control means for resetting said base pressure to the value existing prior to said speed change, said feedback means including time delay means for delaying the repositioning of said second limiting means and the resetting of said base pressure until after the change in the power level in said reactor is complete, and means operatively connecting said first control means to said first and second valve means when said speed is above said selected value to position said first valve means so as to reduce flow of steam through said first conduit means and to position said second valve means so as to permit flow of steam through said second conduit means, thereby slowing said turbine and maintaining a substantially constant pressure in said reactor.

References Cited in the file of this patent

UNITED STATES PATENTS

| | | |
|---|---|---|
| 1,983,275 | Egloff | Dec. 4, 1934 |
| 2,968,600 | Allen | Jan. 17, 1961 |
| 2,999,059 | Treshow | Sept. 5, 1961 |
| 3,035,993 | Treshow | May 22, 1962 |

FOREIGN PATENTS

| | | |
|---|---|---|
| 1,074,169 | Germany | Jan. 28, 1960 |

OTHER REFERENCES

Nucleonics, vol. 13, pp. 42–45, December 1955.
Schultz, "Control of Nuclear Reactors and Power Plants," 2nd edit., March 6, 1961, pp. 322–325.